US008472405B2

(12) United States Patent
Rune

(10) Patent No.: US 8,472,405 B2
(45) Date of Patent: Jun. 25, 2013

(54) SYSTEM AND METHOD FOR HANDLING OVER A USER EQUIPMENT (UE) FROM A PACKET-SWITCHED NETWORK TO A CIRCUIT-SWITCHED NETWORK

(75) Inventor: Göran Rune, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 276 days.

(21) Appl. No.: 13/123,834

(22) PCT Filed: Oct. 12, 2009

(86) PCT No.: PCT/SE2009/051143
§ 371 (c)(1),
(2), (4) Date: Apr. 12, 2011

(87) PCT Pub. No.: WO2010/044730
PCT Pub. Date: Apr. 22, 2010

(65) Prior Publication Data
US 2011/0200011 A1    Aug. 18, 2011

Related U.S. Application Data

(60) Provisional application No. 61/105,631, filed on Oct. 15, 2008.

(51) Int. Cl.
*H04W 4/00* (2009.01)
*H04W 36/00* (2009.01)
(52) U.S. Cl.
USPC .......................................... 370/331; 455/436
(58) Field of Classification Search
None
See application file for complete search history.

(56) References Cited

U.S. PATENT DOCUMENTS

| 2008/0137612 | A1* | 6/2008 | Gallagher et al. | 370/331 |
|---|---|---|---|---|
| 2009/0036131 | A1* | 2/2009 | Diachina et al. | 455/436 |
| 2009/0270097 | A1* | 10/2009 | Gallagher et al. | 455/435.1 |
| 2009/0270098 | A1* | 10/2009 | Gallagher et al. | 455/435.1 |
| 2009/0270099 | A1* | 10/2009 | Gallagher et al. | 455/435.1 |
| 2010/0098023 | A1* | 4/2010 | Aghili et al. | 370/331 |
| 2010/0135245 | A1* | 6/2010 | Zhu et al. | 370/331 |

(Continued)

OTHER PUBLICATIONS

3GPP, 3rd Generation Partnership Project: Technical Specification Group GSM/EDGE Radio Access Network; Generic Access Network (GAN); Stage 2 (Release 8). 3GPP Standard: 3GPP TS43.318 v8.3.0; 3rd Generation Partnership Project (3GPP). Sophia-Antipolis Cedex, France. Aug. 1, 2008.

(Continued)

*Primary Examiner* — Eunsook Choi

(57) ABSTRACT

A system and method for handing over a User Equipment (UE) from a Packet-Switched network to a Circuit-Switched network. A Generic Access Network Controller (GANC) receives a registration message from the UE with a temporary UE identity (GUTI) and uses the GUTI to identify a Mobility Management Entity (MME) controlling a connection with the UE. The GANC informs the MME whether the UE is registered to use Circuit Switched over Long Term Evolution (CS over LTE) signaling using a Generic Access Network (GAN). If so, the MME selectively directs to the GANC, handover signaling relating to the handover of the UE. If not, the MME selectively directs the handover signaling to a Mobile Switching Center (MSC). If the UE changes to a new MME, the new MME is informed whether the UE is registered to use CS over LTE using the GAN.

14 Claims, 6 Drawing Sheets

U.S. PATENT DOCUMENTS

| | | | |
|---|---|---|---|
| 2010/0142488 A1* | 6/2010 | Zhang et al. | 370/332 |
| 2010/0255836 A1* | 10/2010 | Chen | 455/426.1 |
| 2011/0110326 A1* | 5/2011 | Rexhepi et al. | 370/331 |
| 2012/0307735 A1* | 12/2012 | Aghili et al. | 370/328 |

OTHER PUBLICATIONS

Volga Forum. Voice Over LTE via Generic Access, VoLGA Stage 2 v1.2.0. Internet Citation. Aug. 24, 2009, http://www.volga-forum.com/downloads/VoLGA-Stage 2_Spec_v1.2.0.pdf.

Nortel, et al. SRVCC Capabilities and SRVCC Indications. TD S2-0867997. $3^{rd}$ Generation Partnership Project (3GPP). Sophia-Antipolis Cedex, France, Oct. 7, 2008.

3GPP, $3^{rd}$ Generation Partnership Project; Technical Specification Group Services and System Aspects; Single Radio Voice Call Continuity (SRVCC); Stage 2 (Release 8), 3GPP Standard; 3GPP TS 23.216 v8.1.0; $3^{rd}$ Generation Partnership Project (3GPP), Sophia-Antipolis Cedex, France. Sep. 1, 2008.

* cited by examiner

SYSTEM AND METHOD FOR HANDLING OVER A USER EQUIPMENT (UE) FROM A PACKET-SWITCHED NETWORK TO A CIRCUIT-SWITCHED NETWORK

CROSS-REFERENCE TO RELATED APPLICATIONS

This application claims the benefit of U.S. Provisional Application No. 61/105,631, filed Oct. 15, 2008, the disclosure of which is incorporated herein by reference.

TECHNICAL FIELD

Aspects of the invention relate to the field of wireless telecommunications.

BACKGROUND

As used herein, the following abbreviations shall have the following meanings:
3GPP Third Generation Partnership Project
ACM Address Complete Message
BSS Base Station Subsystem
CAMEL Customized Applications for Mobile networks Enhanced Logic
CDMA Code Division Multiple Access
CS Circuit Switched
DTM/PSHO Dual Transfer Mode/Packet Switched Handover
eNodeB Evolved Node B
EPS Evolved Packet System
E-UTRAN Evolved-UTRAN
GAN Generic Access Network
GANC GAN Controller
GBR Guaranteed Bit Rate
GERAN GSM EDGE Radio Access Network
GSM Global System for Mobile Communications
GUTI Temporary UE Identity
GW Gateway
HLR Home Location Register
HO Handover
HSS Home Subscriber Server
IMS IP Multimedia Subsystem
IAM Initial Address Message
IMSI International Mobile Subscriber Identity
IP Internet Protocol
ISDN Integrated Services Digital Network
ISUP ISDN User Part
LTE Long Term Evolution
MM Mobility Management
MME Mobility Management Entity
MMTel Multimedia Telephony
MSC Mobile Switching Center
MSISDN Mobile Station International Subscriber Directory Number
Non-GBR Non-Guaranteed Bit Rate
PS Packet Switched
QCI QoS Class Identifier
RAN Radio Access Network
RANAP Radio Access Network Application Part
S-GW Signaling Gateway
SDP Session Description Protocol
SES Send End Signal
SGSN Serving GPRS Support Node
SRVCC Single Radio Voice Call Continuity
STN-SR Station Transfer Number for SRVCC
TAU Tracking Area Update
UE User equipment
UMTS Universal Mobile Telecommunications System
UTRAN UMTS Radio Access Network
VCC Voice Call Continuity
VDN VCC Directory Number
VoIP Voice over Internet Protocol
VPLMN Visited Public Land Mobile Network
WCDMA Wideband CDMA The 3rd Generation Partnership Project (3GPP) is a collaboration between groups of telecommunications associations, to make a globally applicable third generation (3G) mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture. The project was established in December 1998.

System Architecture Evolution (SAE) is the core network architecture of 3GPP's future Long Term Evolution (LTE) wireless communication standard. SAE is the evolution of the GPRS Core Network, but with a simplified architecture, all IP Network, support for higher throughput and lower latency radio access networks (RANs) and support for, and mobility between, multiple heterogeneous RANs, including legacy systems as GPRS, but also non-3GPP systems such as WiMAX.

The main component of the EPC architecture is the Evolved Packet Core network (EPC). The EPC will be the equivalent of the GPRS networks via the Mobility Management Entity (MME), Serving Gateway and PDN Gateway, and the Home Subscriber Server (HSS) subcomponents. The MME is the key control-node for the LTE access-network. The Serving Gateway routes and forwards user data packets, while also acting as the mobility anchor for the user plane during inter-eNodeB handovers and as the anchor for mobility between LTE and other 3GPP technologies. The PDN Gateway provides connectivity from the UE to external packet data networks by being the point of exit and entry of traffic for the UE. The HSS is the Home Subscriber Server holding data for the subscribers.

The 3GPP Specification provides different methods to support a voice service via EPS. One is IMS MMTel which may be required to use SRVCC if there is no VoIP over packet switched (PS) network radio bearers in the entire wide area network. SRVCC supports IMS Voice with a mechanism to move the GSM, WCDMA, or cdma2000 1xRTT access and support voice service using a CS network bearer rather than a packet bearer which is the primary choice for an IMS based voice service.

Another method to support a voice service via EPS is CS fallback wherein the user has access to the voice service while being connected to the LTE access, but the voice service is provided by an access that has (native) support for a CS voice service, i.e. GSM, WCDMA, or cdma2000 1xRTT. Furthermore, there are industry initiatives to improve CS fallback by re-using some of the SRVCC mechanisms. However, re-using standardized methods provided by 3GPP may create conflicts among the different proposals.

3GPP TS 43.318 entitled, "Generic Access Network (GAN); Stage 2 (Release 8)" defines the stage 2 service description for a Generic Access Network (GAN). It describes the GAN system concepts, documents the reference architecture, functional entities, network interfaces, and high-level procedures. Two modes of operation are described: GAN A/Gb and GAN Iu. The GAN A/Gb mode is an extension of GSM/GPRS mobile services that supports tunneling of Non Access Stratum (NAS) protocols between the MS and the core network over an IP network and the A and Gb interfaces to the MSC and SGSN, respectively. The GAN Iu mode does the same in an extension of UMTS mobile services using the Iu-cs and Iu-ps interfaces to the MSC and SGSN, respectively;

One industry proposal envisions tunneling CS service over IP using the GAN and SRVCC standard.

The architecture 100 in which CS over LTE using GANC is performed is seen in FIG. 1. To support hand-over (HO), the SRVCC mechanisms are re-used such that the UE 101 simulates the SRVCC capability.

To support CS over LTE using GANC, the following E-UTRAN attach procedure, in addition to 3GPPP TS 23.401, is required. CS over LTE using GANC will use the SRVCC additions as follows:

In CS over LTE, the UE 101 includes the SRVCC capability indication as part of the UE network capability in its Attach Request message. A SRVCC capability indicator is used instead of a CS over LTE specific indicator, as no standard exists for CS over LTE using GANC. The MME 104 stores this information for what it believes to be used for SRVCC operation, but in fact is used for CS over LTE.

The eNodeB of the E-UTRAN will receive a UE SRVCC capability indication as part of UE radio capability or from the MME 104 depending on how the standard evolves.

If the subscriber is allowed to have SRVCC in the VPLMN then the HSS includes SRVCC STN-SR and MSISDN in the Insert Subscriber Data message to the MME in normal cases. However because CS over LTE is a proprietary solution, roaming outside home network with SRVCC indication will be disallowed, thus only 2G and 3G will be allowed for roaming users.

To make the process work, the MME and eNodeB must accept that the UE is capable of the SRVCC solution. The eNodeB would signal that a certain HO request sent to the MME is an SRVCC HO or that the target cell capability does not support IMS Voice, or VoIP in general. The foregoing option has not yet been determined by 3GPP. The MME would use the information from the eNodeB, together with the terminal capability and subscription information downloaded from HSS during attach, to determine whether the SRVCC "bearer splitting function" and the Sv interface, both defined for SRVCC, are to be used to perform a PS network to CS network HO.

In 3GPP, the Sv interface in the SRVCC is between the MME and the MSC and in the industry initiative the Sv interface 105 is re-used as an interface between the MME and a GANC as seen in FIG. 1.

FIG. 2 illustrates the HO procedure 200 for CS over LTE GANC that re-uses SRVCC procedures for a handover between CS over LTE to GSM:

Step 201. Based on UE measurement reports, the source E-UTRAN determines whether to trigger a handover to GERAN.

Step 202. The source E-UTRAN sends a Handover Required (Source to Target Transparent Container) message to the source MME. The E-UTRAN also indicates to the MME that this is a SRVCC HO operation. A SRVCC indicator is used as a CS over LTE indicator does not exist. Although the MME and eNodeB interpret this as SRVCC, it is a CS over LTE GANC solution.

Step 203. Based on the QCI associated with the voice bearer (QCI 1 or similar depending on the determination of the 3GPP) and the SRVCC HO indication, the source MME splits the voice bearer from the non voice bearers and initiates the PS network handover procedure for the voice bearer by sending a Forward Relocation Request (VDN/MSISDN), Source to Target Transparent Container, MM Context message to the GANC. The MME receives the MSISDN from the HSS as part of the subscription profile downloaded during the E-UTRAN attach procedure. The MM Context contains security related information. The security related information will not be required if the GANC has that information. Note that VDN and MISDN may not be used by the GANC, as it is part of SRVCC. The GANC discards the information.

Step 204. The GANC interworks the PS network HO request with a RANAP Relocation Required over the Iu interface to the MSC. GANC is regarded as the source RAN by the MSC. The CS Security key may need to be derived.

Step 205. The target MSC performs resource allocation with the target BSS by exchanging Handover Request/Acknowledge messages. If the Inter-MSC HO must be performed, normal inter-MSC procedures will be exchanged between the source MSC and target MSC.

Step 206. When resources have been allocated in BSS, the MSC sends a RANAP relocation command to the GANC.

Step 207. The GANC interworks the RANAP relocation command to a Forward Relocation Response (Target to Source Transparent Container) message which is sent to the source MME. The source MME acknowledges that at the end of the CS network to PS network HO the non-GBR bearers should be preserved.

Step 208a. The source MME sends a Handover Command (Target to Source Transparent Container) message to the source E-UTRAN. The message includes information about the voice component only.

Step 208b. In parallel to the previous step, the source MME exchanges Update Bearer Request/response messages with the Serving GW. The S1-U bearers are released for all EPS bearers and the voice bearer is deactivated. The non-GBR bearers are preserved. The MME is aware that a PS network to CS network HO has occurred due to SRVCC, so upon receipt of downlink data notification from the S-GW the MME shall not page the UE.

Step 209. Source E-UTRAN sends a HO from E-UTRAN Command message to the UE. There may be an indication to UE to inform PS network to CS network HO.

Step 210. HO Detection at the target BSS.

Step 211. The target BSS sends a HO Complete message to the target MSC.

Step 212. The MSC sends a RANAP release command to GANC.

Step 213. The RANAP is release complete.

Step 214. The GANC sends a Forward Relocation Complete message to the source MME, informing it that the UE has arrived on the target side. The source MME acknowledges the information by sending a Forward Relocation Complete Acknowledge message to the GANC.

Step 215. The call has moved over to the CS network In SRVCC, the MME selects the MSC based on the target cell identity. Consequently, the MME is unable to determine which node, an MSC or GANC, it should signal to use the Sv interface procedures if both are present in the network.

Hence, two problems occur: (1) it is not possible to have both methods in the network, because there is only one terminal capability ("SRVCC capable") used for both methods and (2) a network cannot support SRVCC or the industry initiative solution to incoming roaming users, since the interpretation of the terminal capability ("SRVCC capable") is ambiguous.

FIGS. 3 and 4 provide selected parts from 3GPP TS 23.216. FIG. 3 illustrates the SRVCC architecture 300 for E-UTRAN to 3GPP UTRAN/GERAN. FIG. 4 illustrates the steps 400 for SRVCC from E-UTRAN to GERAN without DTM/PSHO support. As seen therein:

Step 401. Based on UE measurement reports, the source E-UTRAN determines to trigger an SRVCC HO to GERAN.

Step 402. The source E-UTRAN sends Handover Required (Target ID, Source to Target Transparent Container) message to the source MME. The E-UTRAN also indicates to the MME that this is a SRVCC HO operation.

Step 403. Based on the QCI associated with the voice bearer (QCI 1) and the SRVCC handover indication, the source MME splits the voice bearer from the non voice bearers and initiates the PS network to CS network HO procedure for the voice bearer only towards MSC Server.

Step 404. The MME sends a Forward Relocation Request (STN-SR, MSISDN, Source to Target Transparent Container, MM Context) message to the MSC server. The MSC server is selected based on the Target ID received in the Handover Required message. The MME receives the STN-SR and MSISDN from the HSS as part of the subscription profile downloaded during the E-UTRAN attach procedure. The MM Context contains security related information. The CS security key is derived by the MME from the E-UTRAN/EPS domain key as defined in TS 33.401. The CS security key is sent in the MM Context.

Step 405. The MSC Server interworks the PS network to CS network handover request with a CS inter-MSC handover request by sending a Prepare Handover Request message to the target MSC.

Step 406. The target MSC performs resource allocation with the target BSS by exchanging Handover Request/Acknowledge messages.

Step 407. The target MSC sends a Prepare Handover Response message to the MSC Server.

Step 408. Establishing a circuit connection between the target MSC and the MGW associated with the MSC server e.g., using ISUP IAM and ACM messages.

Step 409. The MSC server initiates the Session Transfer by using the STN-SR, that is, by sending an ISUP IAM (STN-SR) message towards the IMS. Standard IMS Service Continuity procedures are applied for execution of the Session Transfer, as discussed in TS 23.292 and TS 23.237. During the execution of the Session Transfer procedure, the remote end is updated with the SDP of the CS network access leg. The downlink flow of VoIP packets is switched towards the CS network access leg at this point. Note, however, that if the MSC server is using an ISUP interface, then the initiation of the session transfer may fail if the subscriber profile including CAMEL triggers is not available prior HO (see clause 7.3.2.1 in TS 23.292 [13]).

Step 410. The MSC server sends a Forward Relocation Response (Target to Source Transparent Container) message to the source MME. The source MME preserves the non-GBR bearers at the end of the PS network to CS network HO.

Step 411. The source MME sends a HO Command (Target to Source Transparent Container) message to the source E-UTRAN. The message includes information about the voice component only.

Step 412. The source E-UTRAN sends a HO from E-UTRAN Command message to the UE.

Step 413. Handover Detection at the target BSS.

Step 414. The UE starts the Suspend procedure specified in TS 23.060 [10], clause 16.2.1.1.2. This triggers the Target SGSN to send a Suspend Request message to the Source MME. The MME returns a Suspend Response to the Target SGSN, which contains the MM and PDP contexts of the UE. The MME also starts the preservation of non-GBR bearers and the deactivation of the voice bearer.

Step 415. The target BSS sends a HO Complete message to the target MSC.

Step 416. The target MSC sends an SES (HO Complete) message to the MSC server.

Step 417. Completion of the establishment of the circuit connection between the MSC and the MGW associated with the MSC server is completed, e.g., with the target MSC sending ISUP Answer message to the MSC server.

Step 418. The MSC server sends a Forward Relocation Complete message to the source MME, informing it that the UE has arrived on the target side. The source MME acknowledges the information by sending a Forward Relocation Complete Acknowledge message to the MSC server.

Step 419. The MSC server may perform a MAP Update Location to the HSS/HLR if needed. This may be needed for MSC Server to receive GSM Supplementary Service information and routing of mobile terminating calls properly in certain configuration. Note, however, that this Update Location is not initiated by the UE.

After the CS voice call is terminated and if the UE is still in GERAN, then (as specified in TS 23.060) the UE shall resume PS network services by sending a Routing Area Update Request message to the SGSN. The Update Type depends on the mode of operation of the GERAN network, e.g., in mode I, a Combined RA/LA Update is used and in mode II or III, a Routing Area Update is used.

BRIEF DESCRIPTION OF THE DRAWINGS

In the following section, the invention will be described with reference to exemplary embodiments illustrated in the figures, in which.

DETAILED DESCRIPTION

The following presents a simplified summary of an embodiment of the invention in order to provide a basic understanding of some aspects thereof. This summary is not an exhaustive overview of the invention. It is not intended to identify key or critical elements of the invention or to delineate the scope of the invention. Its sole purpose is to present some concepts in a simplified form as a prelude to the more detailed description that is discussed later. The invention is directed to extending the MME-GANC interface with a function which facilitates the reporting by the GANC which UEs that have registered for the GAN to tunnel CS voice over EPS. The MME then selects the target for a PS network HO, related to a PS network to CS network handover for either SRVCC or GAN to tunnel CS voice over EPS.

Figure 1:
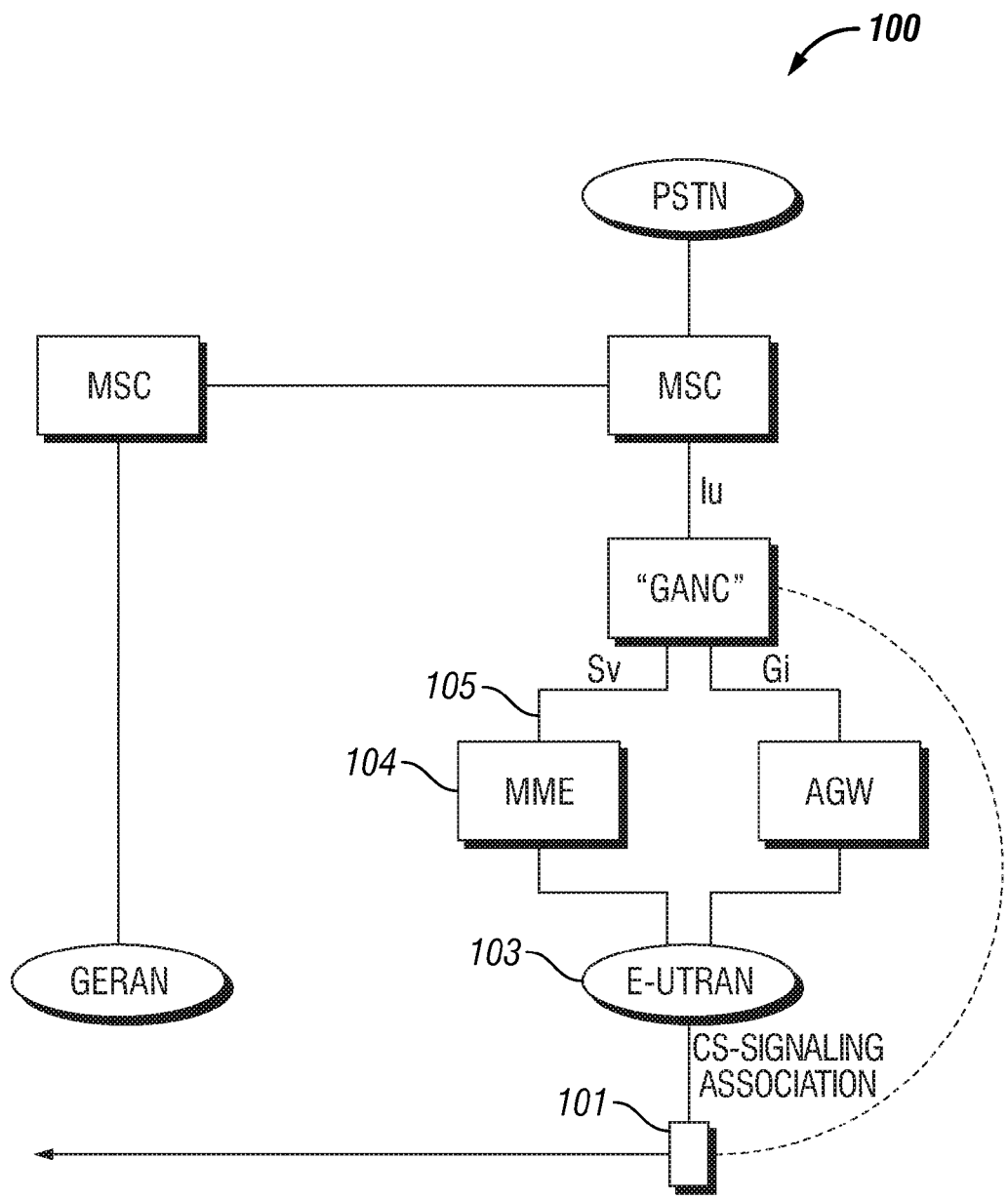
FIG. 1 illustrates the architecture for the industry initiative CS network over LTE using GANC.
Figure 2:
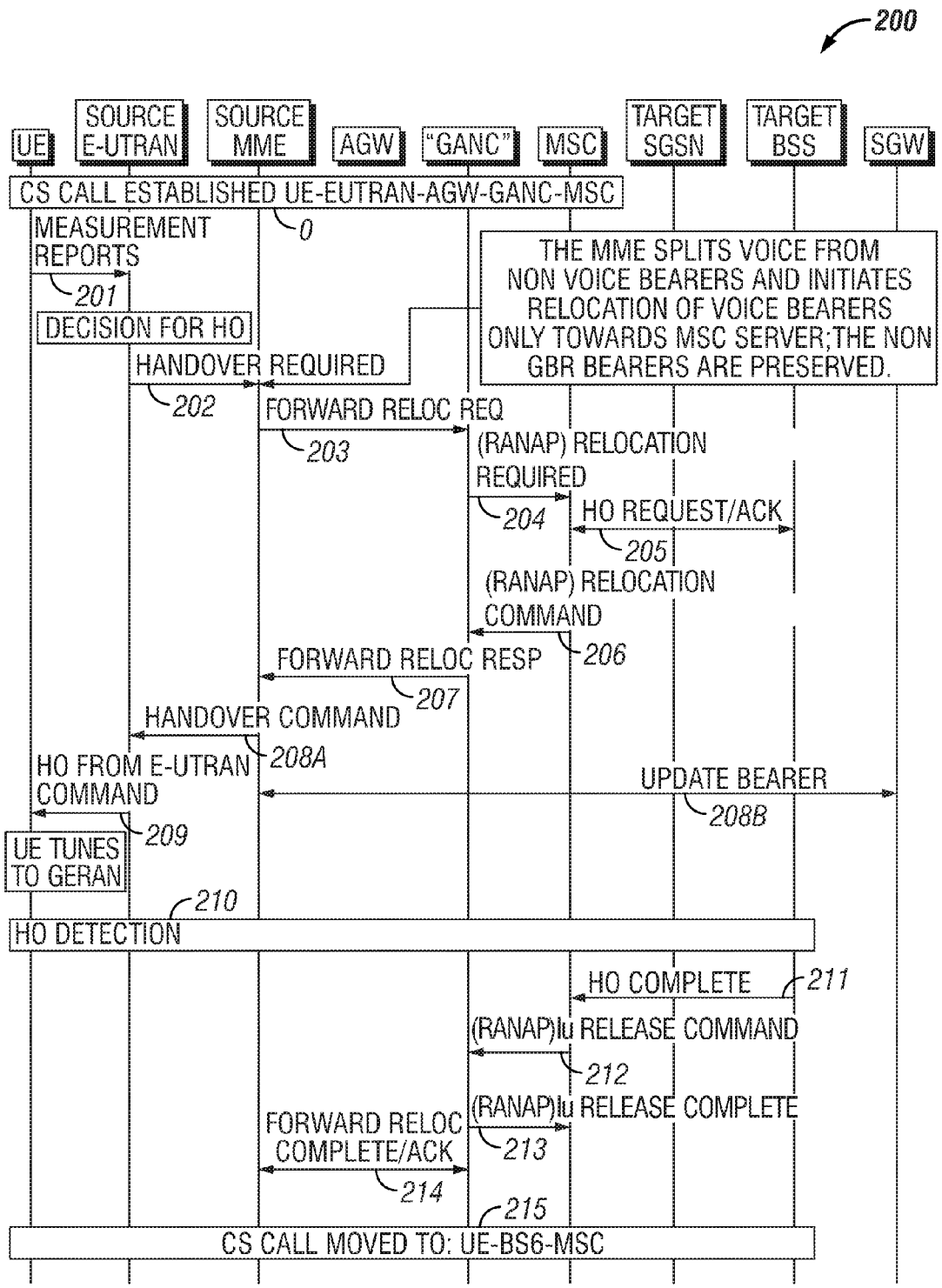
FIG. 2 illustrates the HO procedure for CS over LTE GANC that reuses SRVCC procedures for a handover between CS over LTE to GSM.
Figure 3:
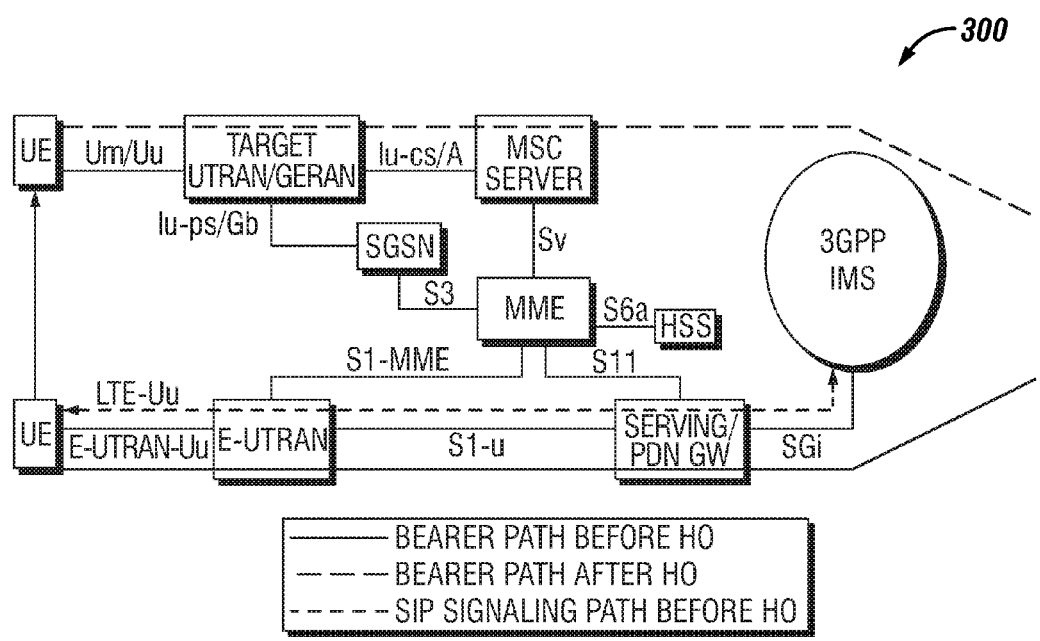
FIG. 3 illustrates the SRVCC architecture for E-UTRAN to 3GPP UTRAN/GERAN.
Figure 4:
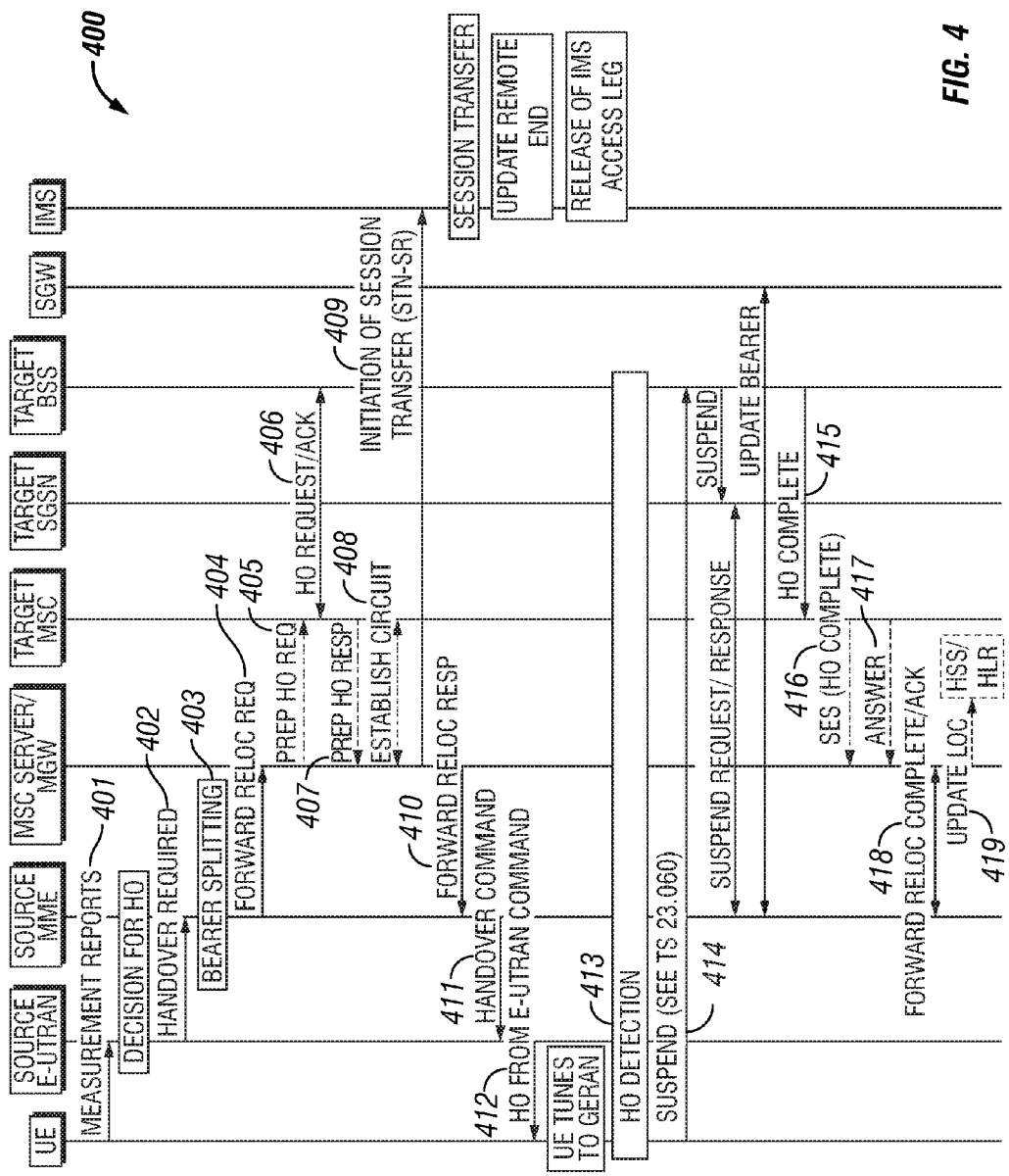
FIG. 4 illustrates the steps for SRVCC from E-UTRAN to GERAN without DTM/PSHO support.
Figure 5:
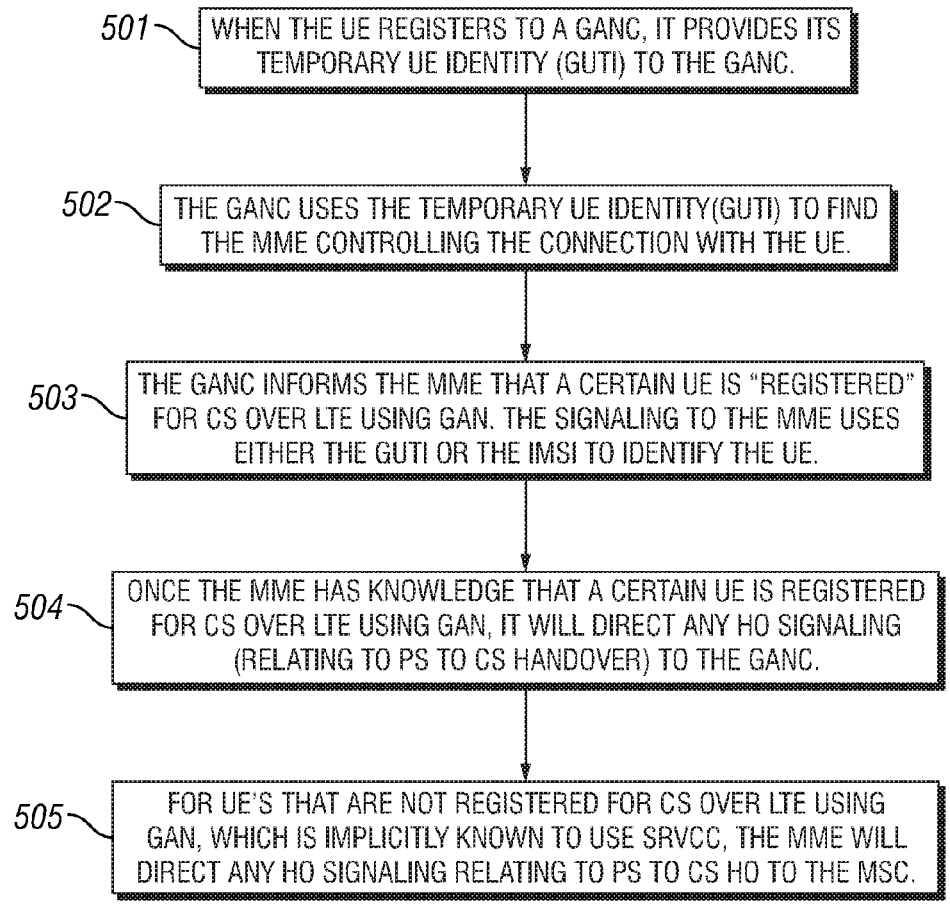
FIG. 5 illustrates the steps of an embodiment of the invention.

Reference is now made to FIG. 5 wherein the steps by which the MME selects the target node for a PS network to CS network handover. The MSC is selected for SRVCC and the GANC is selected for CS over LTE using GAN. The following steps are required to enable the MME to select the target node for a PS network to CS network handover:

In step 501, when the UE registers to a GANC, it provides its temporary UE identity (GUTI) to the GANC.

In step 502, the GANC uses the temporary UE identity (GUTI) to find the MME controlling the connection with the UE. The GANC performs this function in the same manner that a new MME finds the old MME at an inter-MME Tracking Area Update (TAU) based on the GUTI.

In step 503, the GANC informs the MME that a certain UE is registered for CS over LTE using GAN. The signaling to the MME uses either the GUTI or the IMSI to identify the UE. The GANC can also perform step 503 once a voice call is being established.

In step 504, once the MME has knowledge that a certain UE is registered for CS over LTE using GAN, it will direct any HO signaling (relating to a PS network to CS network handover) to the GANC.

For UEs that are not registered for CS over LTE using GAN, which is implicitly known to use SRVCC, in step 505, the MME will direct any HO signaling relating to a PS network to CS network HO to the MSC.

If the MME is changed, the GUTI is reallocated and step 501 is repeated if step 503 has been executed at call set-up, otherwise steps 501 to 503 are repeated. The GUTI can also be reallocated on other occasions such as at TAU, and, again, step 501 is repeated if step 503 has been executed at call set-up, otherwise steps 501 to 503 are repeated Alternatively, the information that a certain UE is registered for CS over LTE using GAN together with the information on which GANC that the UE is registered in is transferred from the old MME to the new MME. This is built into the Context Transfer and Forward Relocation procedures on the MME-MME interface. The steps 501 to 505 of the embodiment of the invention further solve another problem inherent with CS over LTE GANC, that being determining the correct GANC.

The embodiment of the invention enables co-existence of the SRVCC with CS voice over EPS based on GAN. This enables an operator to support CS voice over EPS and IMS MMTel with SRVCC in the network at the same time.

In other words, there are two methods to notify the MME that the UE is registered for CS over LTE using GAN when the MME changes. The first method is as follows:
1. When the MME changes, the GUTI is also re-allocated in accordance with the 3GPP specifications;
2. The UE informs the GANC about the new GUTI, corresponding to step 501 above; and
3. The GANC informs the new MME that the UE is registered for CS over LTE using GAN, corresponding to steps 502 and 503 above;

The second method of notifying the MME that the UE is registered for CS over LTE using GAN when the MME changes is by transferring the information from the old MME to the new MME by a Context Transfer procedure (at inter-MME TAU (e.g. at Idle Mode Mobility)) or by the Forward Relocation procedure (at inter-MME handover).

Figure 6:
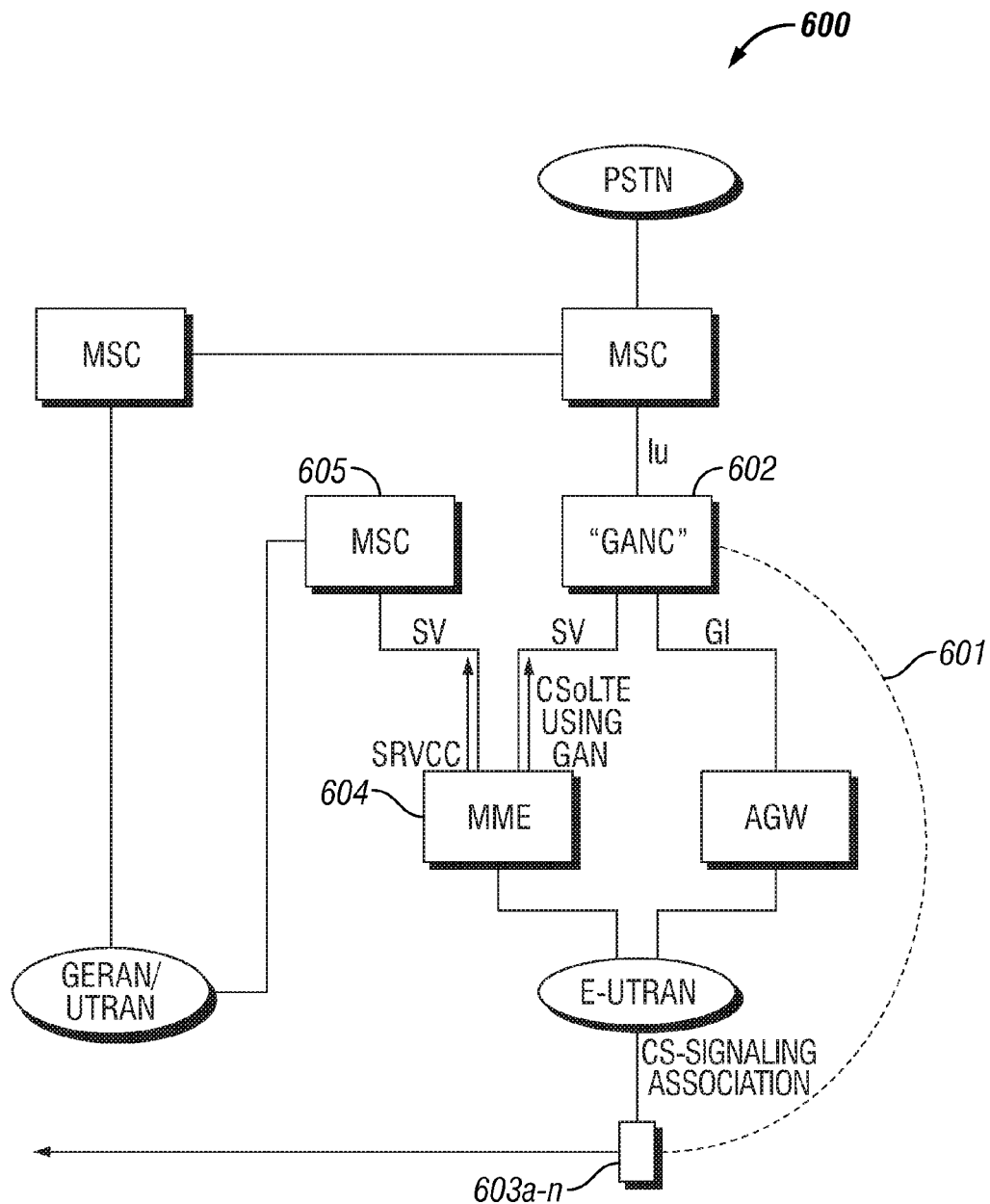
FIG. 6 is a block diagram of the architecture of an embodiment of the invention operable to perform the steps of FIG. 5.

FIG. 6 is a block diagram of an architecture of the embodiment of the invention operable to perform steps 501 to 504. As seen therein, the apparatus 600 for HO signaling in a communications network, comprises an interface 601 within a MME-GANC operable to facilitate the reporting by the GANC 602 which UEs 603a-n have registered with the GAN to tunnel CS voice over the EPS. The MME 604 selects the target for a PS network HO, related to a PS network to CS network HO, for either SRVCC or GAN to tunnel CS voice over EPS. Alternatively, the MME 604 selects a target node for a PS network to CS network handover. The MSC 605 is selected for SRVCC and the GANC is selected for CS over LTE using GAN.

The embodiment of the invention may be realized in hardware, software, or a combination of hardware and software. The embodiment of the invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The embodiment of the invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the embodiment of the invention has been described with reference to certain embodiments, it will be understood by those skilled in the art that various changes may be made and equivalents may be substituted without departing from the scope of the embodiment of the invention. In addition, many modifications may be made to adapt a particular situation or material to the teachings of the embodiment of the invention without departing from its scope. Therefore, it is intended that the embodiment of the invention not be limited to the particular embodiment disclosed, but that the embodiment of the invention will include all embodiments falling within the scope of the appended claims.

The invention claimed is:

1. A method for use in handover signaling in a communications network, wherein a user equipment (UE) is being handed over from a Packet-Switched network to a Circuit-Switched network, the method comprising the steps of:
   (a) receiving at a Generic Access Network Controller (GANC), a registration message from the UE in which the UE provides a temporary UE identity (GUTI) to the GANC;
   (b) utilizing the GUTI by the GANC to identify a Mobility Management Entity
   (MME) controlling a connection with the UE;
   (c) informing the MME by the GANC whether the UE is registered to use Circuit Switched over Long Term Evolution (CS over LTE) signaling using a Generic Access Network (GAN);
   (d) when the UE is registered to use CS over LTE using the GAN, selectively directing from the MME to the GANC, handover signaling relating to the handover of the UE;
   (e) when the UE is not registered to use CS over LTE using the GAN, selectively directing from the MME to a Mobile Switching Center (MSC), the handover signaling relating to the handover of the UE; and
   (f) if the UE changes to a new MME, informing the new MME whether the UE is registered to use CS over LTE using the GAN.

2. The method according to claim 1, wherein step (f) includes the steps of:
upon changing to the new MME, sending a new GUTI from the UE to the GANC;
utilizing the new GUTI by the GANC to identify the new MME; and
informing the new MME by the GANC whether the UE is registered to use CS over LTE using the GAN.

3. The method according to claim 1, wherein step (f) includes transferring from the MME to the new MME, an indication of whether the UE is registered to use CS over LTE using the GAN.

4. The method according to claim 3, wherein the new MME finds the MME at an inter-MME Tracking Area Update (TAU) based on the GUTI using Context Transfer and Forward Relocation procedures on an MME-MME interface.

5. The method according to claim 1, wherein step (c) includes sending from the GANC to the MME, either the GUTI or the UE's International Mobile Subscriber Identity (IMSI) to identify the UE.

6. The method according to claim 1, wherein step (c) is performed when a voice call is being established.

7. The method according to claim 1, wherein the GUTI is reallocated during a Tracking Area Update (TAU).

8. A method for use in handover signaling in a communications network in which a user equipment (UE) moves from an old Mobility Management Entity (MME) to a new MME, the method comprising the steps of:
informing the old MME by a Generic Access Network Controller (GANC), whether the UE is registered to use Circuit Switched over Long Term Evolution (CS over LTE) signaling using a Generic Access Network (GAN);
identifying the old MME by the new MME; and
transferring from the old MME to the new MME, an indication of whether the UE is registered to use CS over LTE using the GAN, wherein the transferring step is performed during either a Context Transfer procedure at inter-MME Tracking Area Update (TAU) or during a Forward Relocation procedure at inter-MME handover.

9. An apparatus for facilitating a Packet-Switched to Circuit-Switched handover of a User Equipment (UE), in a communications network having a Mobility Management Entity (MME), a Generic Access Network Controller (GANC), and a Mobile Switching Center (MSC), the apparatus comprising:
a first interface between the MME and the GANC operable to facilitate reporting by the GANC to the MME, whether the UE has registered with a Generic Access Network (GAN) to tunnel Circuit-Switched voice over the Evolved Packet System (EPS);
a second interface between the MME and the MSC;
wherein the MME is adapted to utilize the first interface to selectively direct from the MME to the GANC, handover signaling relating to the UE when the UE is registered with the GAN to tunnel Circuit Switched voice over the EPS; and
wherein the MME is adapted to utilize the second interface to selectively direct from the MME to the MSC, handover signaling relating to the UE when the UE is not registered with the GAN to tunnel Circuit Switched voice over the EPS.

10. A system for selecting a target node for a Packet-Switched to Circuit-Switched handover of a User Equipment (UE) in a communications network having a Mobile Switching Center (MSC), the system comprising:
a Generic Access Network Controller (GANC); and
a Mobility Management Entity (MME) in communication with the GANC and the MSC, the MME controlling a connection with the UE;
wherein the GANC is configured to:
receive a registration message from the UE, the registration message including a temporary UE identity (GUTI);
utilize the GUTI to identify the MME controlling the connection with the UE; and
inform the MME whether the UE is registered to use Circuit Switched over Long Term Evolution (CS over LTE) signaling using a Generic Access Network (GAN); and
wherein the MME is configured to:
detect that the UE is being handed over from a Packet-Switched network to a Circuit-Switched network;
selectively direct from the MME to the GANC, handover signaling related to the UE when the UE is registered to use CS over LTE using the GAN; and
selectively direct from the MME to the MSC, the handover signaling related to the UE when the UE is not registered to use CS over LTE using the GAN.

11. The apparatus according to claim 10, wherein when the UE changes to a new MME, the GANC is further configured to inform the new MME whether the UE is registered to use CS over LTE using the GAN.

12. The apparatus according to claim 10, wherein when the UE changes to a new MME, the new MME is configured to learn from an old MME whether the UE is registered to use CS over LTE using the GAN.

13. Computer software loaded into a non-transitory computer memory and having instructions executed by a computer processor within a Mobility Management Entity (MME), wherein when the instructions are executed, the processor causes the MME to perform the steps of:
receiving from a Generic Access Network Controller (GANC), an indication of whether a User Equipment (UE) involved in a handover from a Packet-Switched network to a Circuit-Switched network is registered to use Circuit Switched over Long Term Evolution (CS over LTE) signaling using a Generic Access Network (GAN);
when the UE is registered to use CS over LTE using the GAN, selectively directing to the GANC, handover signaling relating to the UE; and
when the UE is not registered to use CS over LTE using the GAN, selectively directing to a Mobile Switching Center (MSC), the handover signaling relating to the UE.

14. The computer software according to claim 13, wherein the processor also causes the MME to select a target node for the Packet-Switched to Circuit-Switched handover.

* * * * *

UNITED STATES PATENT AND TRADEMARK OFFICE
CERTIFICATE OF CORRECTION

PATENT NO. : 8,472,405 B2
APPLICATION NO. : 13/123834
DATED : June 25, 2013
INVENTOR(S) : Rune It is certified that error appears in the above-identified patent and that said Letters Patent is hereby corrected as shown below:

In the Specification

In Column 4, Line 9, delete "MISDN" and insert -- MSISDN --, therefor.

In Column 7, Line 29, delete "repeated" and insert -- repeated. --, therefor.

In Column 7, Line 52, delete "above;" and insert -- above. --, therefor.

Signed and Sealed this
Fifth Day of November, 2013

Teresa Stanek Rea
*Deputy Director of the United States Patent and Trademark Office*